United States Patent [19]

Nagafuji

[11] Patent Number: 5,681,256
[45] Date of Patent: Oct. 28, 1997

[54] SCREW DECANTER CENTRIFUGE HAVING A SPEED-TORQUE CONTROLLER

[75] Inventor: Masanori Nagafuji, Kawasaki, Japan

[73] Assignee: NKK Corporation, Tokyo, Japan

[21] Appl. No.: 549,259

[22] Filed: Oct. 27, 1995

[30] Foreign Application Priority Data

Nov. 10, 1994 [JP] Japan .................................. 6-276536
Jun. 8, 1995 [JP] Japan .................................. 7-141488

[51] Int. Cl.$^6$ ........................................ B04B 9/10
[52] U.S. Cl. ................................... 494/9; 494/84
[58] Field of Search .................... 494/7–10, 52–54, 494/82–84

[56] References Cited

U.S. PATENT DOCUMENTS

| | | | |
|---|---|---|---|
| 3,734,399 | 5/1973 | Oas | 494/53 X |
| 4,299,353 | 11/1981 | Bruning et al. | 494/8 |
| 4,369,915 | 1/1983 | Oberg et al. | 494/8 |
| 4,421,502 | 12/1983 | Jakobs | 494/7 |
| 4,978,331 | 12/1990 | Luchetta et al. | 494/53 X |
| 5,037,372 | 8/1991 | Weder . | |
| 5,197,939 | 3/1993 | Cederkvist et al. . | |
| 5,203,762 | 4/1993 | Cooperstein . | |
| 5,403,260 | 4/1995 | Hensley | 494/8 X |

FOREIGN PATENT DOCUMENTS

| | | | |
|---|---|---|---|
| 469944 | 2/1992 | European Pat. Off. | 494/53 |
| 0 493 009 | 7/1992 | European Pat. Off. . | |
| 293968 | 9/1991 | Germany | 494/7 |
| 3-60751 | 3/1991 | Japan . | |
| 3-505698 | 12/1991 | Japan . | |
| 4-290562 | 10/1992 | Japan . | |
| 5-184973 | 7/1993 | Japan . | |
| 2 097 154 | 10/1982 | United Kingdom . | |
| WO 89/12506 | 12/1989 | WIPO . | |

OTHER PUBLICATIONS

Patnt Abstracts of Japan, vol. 18 No. 382 (E-1580), Jul. 19, 1994 & Jp-A-06 105582 (Yasakawa Electric Corp.) Apr. 15, 1994.

Patent Abstracts of Japan, vol. 18, No. 652 (E-1642) Dec. 12, 1994 & JP-A-06 253575 (Toshiba Corp.) Sep. 9, 1994.

*Primary Examiner*—Charles E. Cooley
*Attorney, Agent, or Firm*—Frishauf, Holtz, Goodman, Langer & Chick

[57] ABSTRACT

A screw decanter centrifuge including a cylindrical bowl rotatable in one direction, a main drive motor coupled to the bowl for rotatably driving the bowl, a screw conveyor which is disposed concentrically in the bowl and which is rotatable in the same direction as the bowl at a differential rotation speed from the bowl, and an induction type screw conveyor motor for driving the screw conveyor. The differential rotation speed is changed in response to a carrying torque of the screw conveyor. An induction type screw conveyor motor is provided for driving the screw conveyor. The induction type screw conveyor motor has a shaft connected directly to, or coupled to, a shaft of the screw conveyor, and the induction type screw conveyor motor is controlled by a speed-torque controller. The speed-torque controller includes a speed controller for calculating the differential rotation speed based on rotations indicated by an induction motor tachometer for detecting a speed of the induction type screw conveyor motor, and on rotations indicated by a bowl tachometer for detecting a speed of the bowl. The speed-torque controller further includes a vector control inverter for independently controlling an exciting current and a torque current of the induction type screw conveyor motor based on a speed command value outputted from the speed controller and an actual speed of the induction type screw conveyor motor outputted from the induction motor tachometer.

4 Claims, 3 Drawing Sheets

SCREW DECANTER CENTRIFUGE HAVING A SPEED-TORQUE CONTROLLER

BACKGROUND OF THE INVENTION

1. Field of the Invention

The present invention relates to a centrifuge used for dehydrating or concentrating sludge, or various raw materials or manufactured products arising out of many fields, such as from clean water or sewage treatment plants, excrement treatment plants, refuse incinerating and disposal plants, or from process used in the food industry, livestock industry, chemical industry, and mining and steel industry and more particularly, the present invention relates to a horizontally continuous centrifuge which has a cylindrical bowl rotating in one direction and a screw conveyor disposed concentrically in the bowl and rotating in the same direction as that of the bowl with a differential speed.

2. Description of Related Arts

In general, a screw decanter centrifuge has a cylindrical bowl rotating in one direction and a screw conveyor disposed concentrically in the bowl and rotating in the same direction as that of the bowl with a differential speed. The bowl creates a centrifugal force to dehydrate a fluid feed mixture. It is rotated at a constant but variable speed to separate the feed mixture into a component containing solids (hereinafter called dehydrated cake) and other components (liquid). As a result of the centrifugal force created by this rotation, the solids which are heavier than water are collected on the inner wall of the bowl. The screw conveyor is rotated at a relative velocity slightly differentiated from the velocity of the bowl. This differential speed creates a relative motion between the series of screw and the bowl inner wall, which causes the solids to be conveyed slowly in the direction of the cylinder axis along the bowl inner wall. The light component or liquid in the feed mixture is separated from the solids thanks to the centrifugal force, and moves toward the inside in the radial direction. Thereafter, the dehydrated cake which is a separated heavy material, and the liquid which is a separated light material, are usually discharged separately from opposite ends of the bowl.

The differential speed between the screw conveyor and the bowl can be varied during the operation of the centrifuge dependent on several parameters and quality of the feed mixture to be taken out by separation. In actual operation these conditions are well-known factors. Accordingly, maintenance of constant revolutions is generally required for the bowl. On the other hand, regarding the number of revolutions of the screw conveyor, there are two systems, the first of which keeps the number of revolutions of the screw conveyor always constant in response to that of the bowl, and the second of which varies the number of revolutions of the screw conveyor in response to the carrying torque of the screw conveyor.

Operation of the screw decanter centrifuge requires constant concentration of the obtained dehydrated cake and minimization of the water content without clogging in the bowl. The mechanical factors which affect the dewaterbility are centrifugal force, dehydration time, shape of bowl, and consolidation work. The consolidation work refers to the actions by which the solids collected on the inner wall of the bowl are compressed by a load weighed down on the solids themselves under a high centrifugal force, causing the density to increase and the moisture to be discharged. If the solids fed to the centrifuge have a high concentration, the amount of solids accumulating in the bowl increases. Such increase of the amount of solids may increase the carrying torque of the screw conveyor, or in some cases exceed the allowable value, inviting mechanical trouble.

For this reason, the first system, which always maintains constant revolutions of the screw conveyor in response to the number of revolutions of the bowl, makes the differential speed large so as to prevent the carrying torque of the screw conveyor from exceeding the allowable value even if the amount of the feed mixture or the concentration of the solids is changed to increase. This system causes smaller consolidation actions with a limit on improvement of hydrated performance.

In contrast to the above described first system, the second system, which varies the number of revolutions of the screw conveyor in response to the carrying torque of the bowl, always ensures constant actions of consolidation and improvement dehydrating performance for any change in the amount or the feed mixture and the solid concentration. Since the carrying torque of the screw conveyor decreases in this operation when the amount of solids on the inner wall or the bowl decreases, the differential speed is reduced so as to prevent the consolidation work from decreasing. The decrease in the amount of conveyance of the screw conveyor causes solids oil the bowl inside wall to be restored for recovering the consolidation actions.

Inversely, when the amount of the solids on the inner wall of the bowl tends to increase, the differential speed of the screw conveyor is gained to increase the amount of conveyance of the screw conveyor. As the result, the amount of the solids on the inner wall of the bowl is decreased, and the carrying torque of the screw conveyor is also decreased.

Various drive systems for creating a differential speed between the bowl and the screw of a centrifuge are available. They can be classified broadly into two groups: one is a backdrive system using electric motors and a differential gear, and the other is a drive system using a hydraulic motor.

Figure 3:
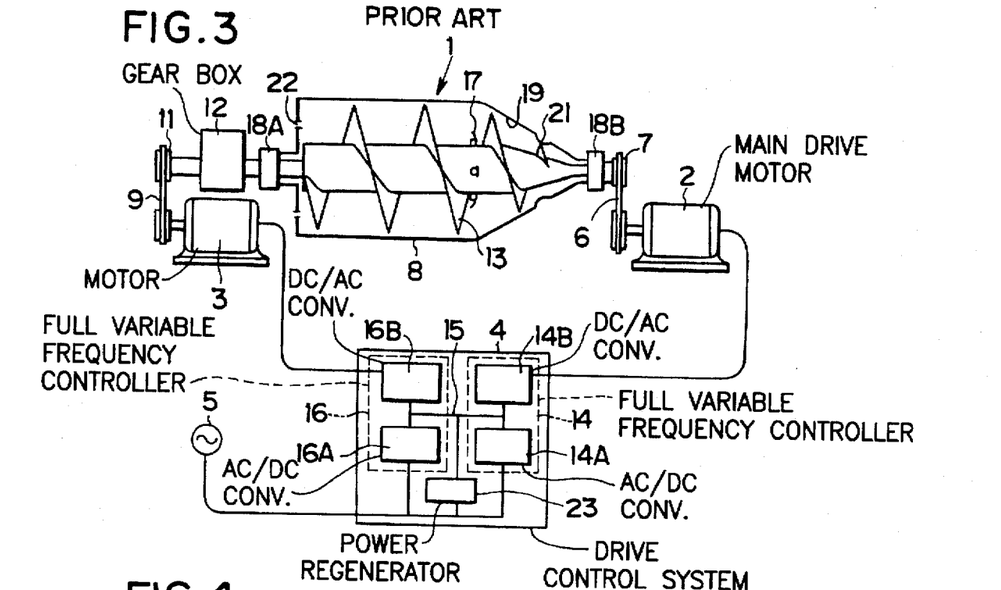
FIG. 3 is a schematic view of a prior art screw decanter centrifuge using an electrically backdrive motor system.

FIG. 3 is a schematic view of a prior art screw decanter centrifuge using an electric motor backdrive system (prior art 1), which is disclosed in, for example, Japanese unexamined patent publication No. 5-184973. A screw decanter centrifuge 1 of prior art 1 using an electric motor drive system has a main drive motor 2 and a backdrive motor 3. These motors are connected to an AC power source 5 through a drive control system 4. The main drive motor 2 is adapted to drive a bowl 8 of the centrifuge 1 via a V belt 6 and a pulley 7. The backdrive motor 3 is adapted to drive a screw conveyor 13 of the centrifuge 1 via a V belt 9, a pulley 11, and a gearbox 12 which is a planetary differential gear. The drive control system 4 converts AC power into DC power at a first part 14A of a full variable frequency controller 14, and converts DC power into AC power with variable voltage at a second part 14B so that the speed of the main drive motor 2 may be variably controlled. Another full variable frequency controller 16 connected to the full variable frequency controller 14 via a common DC bus 15 has a first part 16A and a second part 16B as the full variable frequency controller 14 does, and variably controls the speed of the backdrive motor 3 at a second speed different from the speed of the main drive motor 2 such that the number of revolutions of the screw is lower by the differential speed than that of revolutions.

The screw conveyor 13 is provided with a plurality of nozzles 17 for supplying a feed mixture, which is a stock solution, into the bowl 8 on the shaft tip end side (on the right side in the figure). The bowl 8 is rotatably journalled by bearings 18A and 8B at each end, and a tapered part 19 is formed on one end side. The tapered part 19 is provided with a plurality of the discharge ports 21 for discharging the dehydrated cake separated from the stock solution, and a plurality of water discharge ports 22 for discharging liquid separated from the stock solution on the other end. In a drive control system 4 provided is a regeneration package 23 for returning power to an AC power source 5 when the backdrive motor 3 generates power by braking.

In this prior art screw decanter centrifuge using the electric motor drive system, the screw conveyor 13 tends to rotate at the speed of the bowl 8 due to the torque and friction caused by the rotation of the liquid and the dehydrated cake in the bowl 8. Therefore, during the operation, the backdrive motor 3 always acts as a brake by receiving a torque from the screw conveyor 13 to rotate the screw conveyor at a lower speed than that of the bowl as much as the differential speed, so that a constant differential speed can be maintained between the bowl 8 and the screw conveyor 13.

Figure 4:
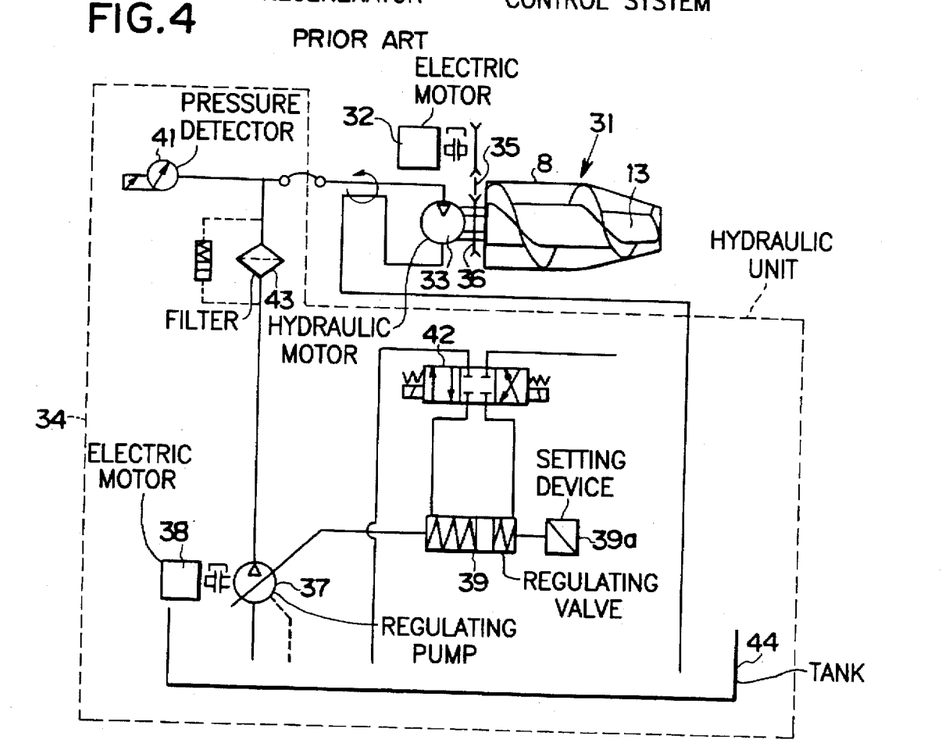
FIG. 4 is a schematic view of a prior art screw decanter centrifuge using a hydraulic motor system.

FIG. 4 is a schematic view of a prior art screw decanter centrifuge by a drive system using a hydraulic motor (prior art 2), for example, which is disclosed in Japanese unexamined patent publication No. 4-290562. A screw decanter centrifuge 31 using a hydraulic motor drive system has an electric motor 32 for driving a bowl 8 as a main drive motor, a hydraulic motor 33 for driving a screw conveyor 13 as a backdrive motor, and a hydraulic unit 34 for driving the hydraulic motor 33. The hydraulic motor 33 is connected directly to the shaft of the screw conveyor 13. The drive force of the electric motor 32 is transmitted to the bowl 8 via a V belt 35 and a pulley 36.

The hydraulic unit 34 includes a regulating pump 37 for driving the hydraulic motor 33, an electric motor 38 for driving the regulating pump 37, a regulating valve 39 for regulating the discharge quantity of the regulating pump 37, setting a means 39a for setting a spool position of the regulating valve 39, a pressure detector 41 for detecting a hydraulic pressure sent to the hydraulic motor 33, a three-position valve 42 for operating the regulating valve 39 by being switched by the output signal from the pressure detector 41, a filter 43, and a tank 44.

The prior art screw decanter centrifuge of prior art 2 operated by the hydraulic motor drive system is capable of increasing the layer of the dehydrated cake in the bowl and the degree of the consolidation of the dehydrated cake due to the probability of setting a high carrying torque.

In the prior art screw decanter centrifuges of prior art 2 using the hydraulic motor drive system, the hydraulic motors comprises both of the main drive motor and the backdrive motor, as disclosed in Japanese unexamined patent publication No. 3-60751. Even in this case, the hydraulic unit is justly required for these screw decanter centrifuges.

Figure 5:
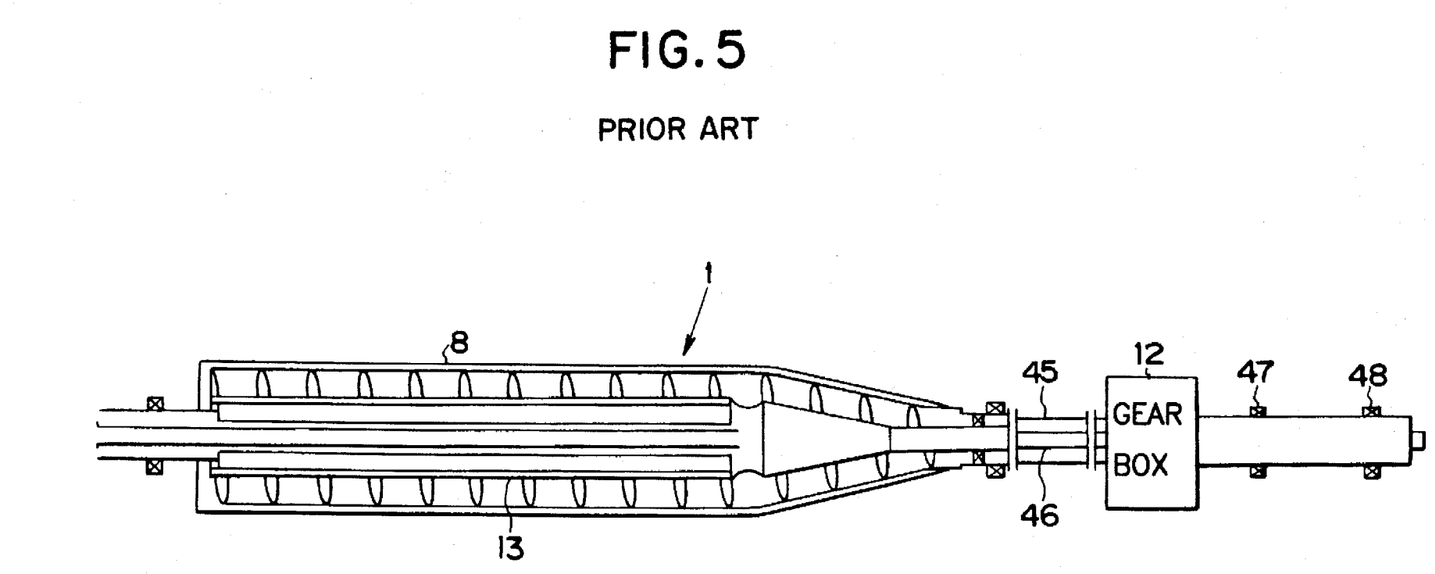
FIG. 5 is a schematic view of a prior art screw decanter centrifuge using a differential gear system.

FIG. 5 is a view of a further prior art screw decanter centrifuge (prior art 3) shown in Japanese unexamined patent publication No. 3-505698. The screw decanter centrifuge connects a gear (a differential gear) 12 to a bowl 8 and a screw conveyor 13 of the screw decanter centrifuge by means of two couplings 45, 46 having flexural and torsional rigidity and the gear 12 is supported by bearings 47, 48 exclusively supporting the gear.

This constitution mentioned above causes the load of the centrifuge 1 to be reduced in weight, and also the vibration generated from the centrifuge 1 to be prevented from being transmitted to the gear 12. This prevention raises the allowable maximum number of revolutions of the centrifuge 1 and improves the separation effect.

The screw decanter centrifuge or prior art 1 has, however, the problems described below because the backdrive motor 3 is not connected directly to the screw conveyor 13.

(a) There are transmission loss and delay due to the slip or the V belt 9.

(b) In consideration or the bowl 8, no high reduction ratio is allowable for gears in the drive system of the screw conveyor 13, which causes difficulty in providing high output.

(c) The differential speed is 3 to 5 rpm at the minimum, and is difficult to decrease any further.

(d) The capacity of the main drive motor 2 must be increased because the conveying load is weighed to the bowl 8.

(e) A regeneration circuit must be incorporated for energy-saving operation.

(f) The gear (differential gear) is expensive.

(g) Since the full variable frequency inverter generates the necessary torque due to the slip of the induction motor and varies the number of revolutions of the induction motor, the independent torque control cannot be performed. For this reason, in order to control the carrying torque of the screw conveyor 13 to be constant in the operation of the centrifuge using the full variable frequency inverter, a torque detector is set on the screw conveyor 13 to detect the load torque, to compute an estimated number of revolutions of the drive motor for the screw conveyor by a calculator and to give a command of a number of revolutions to the drive motor. However, it is necessary to perform the control through repetition of try and error to determine whether the value of the load torque is obtained as a predetermined value or not. Furthermore, for the reason of item (a) described above, the detected value and the predetermined value are less prone to agree with each other, which causes difficulty in giving a constant control to the carrying torque.

(h) The gear 12 is of a cantilever structure in view or the dynamics and the beam structure occupies a considerable part or the total weight of screw decanter centrifuge 1. For this reason, the radial load weighing on the bearing 18A is great, causing to a short life of the bearings.

(i) The screw decanter centrifuge 1 vibrates due to the unbalance of the bowl 8 and the screw conveyor 13, disturbance to smooth rotation of the screw conveyor 13 by entrance of foreign materials into the bowl 8, sliding face flaws or lack of oil film on the bearings 18A, 18B, wear of the gear 12 and the like. Since the gear 12 transmits the torque through engagement of precisely manufactured gears, the influence of the vibration from the outside on the gear is not desirable and further this vibration sometimes is amplified due to the existence of a comparatively heavy gear as the gear 12. Because of these reasons or causes, the life of the gear 12 and of the bearings 18A, 18B is shortened.

(j) Even if increase in the number of revolutions of the bowl 8 or the carrying torque of the screw conveyor 13 is required by the factors described above in items (h) and (i), the increase cannot be actualized because it is restricted by the weight of the gear 12.

The prior art screw decanter centrifuge of prior art 2 does not present the problems described above, and has an advantage of reducing the differential speed down to 0.5 rpm, but poses newly the following problems.

(k) The hydraulic unit 34 is separately needed.

(l) The hydraulic loss is great.

(m) Cooling water for the hydraulic system is needed.

(n) The system configuration is inevitably complicated.

(o) The hydraulic motor 33 and the hydraulic unit 34 are expensive.

(p) Oil causes fire.

(q) The hydraulic motor 33 is dynamically composed of a cantilever structure and the weight of the hydraulic motor 33 is lighter than that of the gear 12. The weight of the hydraulic motor, however, still occupies a considerable part of the total weight of the screw decanter centrifuge 31. For this reason, the radial load of the bearings supporting the bowl 8 on the side of the hydraulic motor 33 is great which shortens the life of the bearings.

(r) Due to the factors described in item (q), even if the number of revolutions of the bowl 8 is tried to be increased, it is difficult due to the restriction of the weight load of the hydraulic motor 33.

Further, the prior art screw decanter centrifuge of prior art 3 has the following problems.

(s) The gear 12 is connected through the two couplings 45, 46 having a flexural and torsional rigidity to the bowl 8 and the screw conveyor 13. Since the couplings must have a special double structure, the manufacture and the maintenance of the couplings are extremely difficult.

(t) The bearings 47, 48 supporting the gear 12 are separately required. In addition, due to the cantilever structure, the radial load is great. Thus, the life of the bearings 47, 48 is short.

SUMMARY OF THE INVENTION

The present invention solves such problems as mentioned above, and the object of the present invention is to provide a screw decanter centrifuge which simplifies the system constitution, lowers not only the manufacturing cost but also the running cost, and improves the dehydrating (solid-liquid separation) performance.

To attain the object, the present invention provides a screw decanter centrifuge which has a cylindrical bowl rotating in one direction; a main drive motor for driving the bowl; a screw conveyor disposed concentrically in the bowl and rotating in the same direction as that of the bowl with a differential speed from rotation speed of the bowl; and a screw conveyor motor for driving the screw conveyor, the differential speed being changed in response to a carrying torque of the screw conveyor. The screw decanter centrifuge comprises: the screw conveyor drive motor being an induction motor which is controlled by a speed-torque controller; and a shaft of the induction motor being connected directly to a shaft of the screw conveyor.

Further, the screw conveyor motor of the screw decanter centrifuge can comprise an induction motor which is controlled by a speed-torque controller; and a shaft of the induction motor may be connected through a flexural coupling to a shaft of the screw conveyor.

DETAILED DESCRIPTION OF EMBODIMENTS

Embodiment 1

Now, an embodiment of the present invention will be described below with reference to FIG. 1.

Figures 1, 1A:
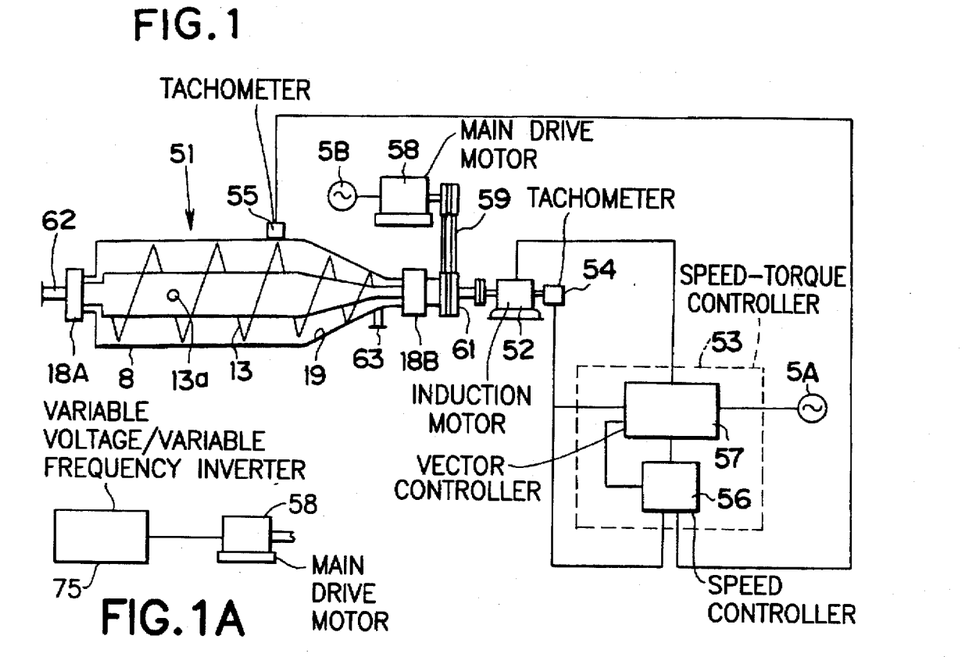
FIG. 1 is a schematic view of an embodiment of a screw decanter centrifuge of the present invention.
FIG. 1A is a partial view showing a modification of the screw decanter centrifuge of the present invention.

FIG. 1 is a schematic view of an embodiment of a screw decanter centrifuge of the present invention. In this figure, the same reference numerals are applied to the elements corresponding to those in the prior art screw decanter centrifuge shown in FIG. 3.

A screw decanter centrifuge 51 of the present embodiment uses an induction motor 52 as a motor for driving a screw conveyor 13. The induction motor 52 is connected directly to a shaft of the screw conveyor 13, and is connected to an AC power source 5A through a speed-torque controller 53. The speed-torque controller 53 is connected to an induction motor tachometer 54 for detecting the speed of the induction motor 52, and is also connected to a bowl tachometer 55 for detecting the speed of a bowl 8. A differential speed is calculated based on the detection results of the induction motor tachometer 54 and the bowl tachometer 55. The speed-torque controller 53 is constructed in combination with a speed controller 56 which determines the speed of the induction motor 52 and a vector controller 57. The vector controller 57 which independently controls an exciting current and a torque current of the induction motor 52 based on a speed command value output ted from the speed controller 56 an actual speed of the induction motor 52 outputted from the induction motor tachometer 54, and the vector controller 57 is always capable of keeping a target differential speed even if the carrying torque of the screw conveyor 13 is changed. Thus, the screw decanter centrifuge 51 is constructed in combination with the mentioned devices.

On the other hand, a main drive motor 58 is connected directly to an AC power source 5B, and is adapted to drive the bowl 8 of the centrifuge 51 via a V belt 59 and a pulley 61. It is preferable that frequency conversion can be made by control of a variable voltage variable frequency inverter 75, as shown in FIG. 1A.

The bowl 8 is rotatably supported by bearings 18A, 18B at each end of the bowl 8, and a tapered part 19 is formed on one end side where the shaft of the bowl 8 is connected to the main drive motor 58. The bearing 18A at one side of the bowl 8 (on the left side of the FIG. 1) is provided with an injection pipe 62 for injecting the stock solution, and the end of the injection pipe 62 is inserted into the inside hollow space of the shaft portion of the screw conveyor 13. The screw conveyor 13 is provided with a plurality of holes 13a for introducing the stock solution supplied through the injection pipe 62 into the bowl 8. The bearing 18B at the other side of the bowl (on the right side of FIG. 1) is provided with a discharge port 63 for discharging the dehydrated cake separated from the stock solution. Configurations other than those mentioned above are similar to those of the prior art centrifuge of FIG. 3 described above.

In the screw decanter centrifuge of the present embodiment, the speed-torque controller 53 carries out differential speed control such that the number of revolutions of (N+ΔN) is given to the screw conveyor 13 for gaining a differential speed ΔN in response to the number of revolutions N of the bowl 8. At the same time, the carrying load (torque) is controlled so as to be constant. Namely, increase in the carrying load (torque) of the screw conveyor 13 increases the differential speed, causing the solid carrying speed to increase and the discharge amount of solids to increase. And inversely, if the carrying load (torque) of the screw conveyor 13 decreases, the differential speed will decrease, causing the solid carrying speed to decrease and the discharge amount of solids to decrease. Thus, the solid residence time in the bowl 8 is prolonged so that the consolidation effect may be increased so as to control the carrying torque to be constant.

As described above, the screw decanter centrifuge of the present embodiment uses the induction motor 52 controlled by a vector control inverter as a motor for driving the screw conveyor 13, and the shaft of the induction motor 52 is connected directly to the shaft of the screw conveyor 13. Therefore, the speed and torque of the induction motor 52 is controlled independently by the speed-torque controller 53 without using a torque detector or the like. As a result, a minute differential speed is provided in response to the number of revolutions of the bowl 8, and the differential speed is changeable in response to the carrying torque with high accuracy and good response.

As described above, according to the present invention, the induction motor controlled by the vector control inverter is used as a motor for driving the screw conveyor, and the shaft of the induction motor is connected directly to the shaft of the screw conveyor. Therefore, the system constitution is simplified, and both the manufacturing cost and the running cost are lowered; still further, the speed control and the torque control are carried out independently. In addition, the differential speed is changeable in response to the carrying torque with high accuracy and good response. Thus, the dehydrating (solid-liquid separation) performance is improved.

Embodiment 2

Subsequently, another embodiment of the present invention will be described below with reference to FIG. 2.

Figure 2:
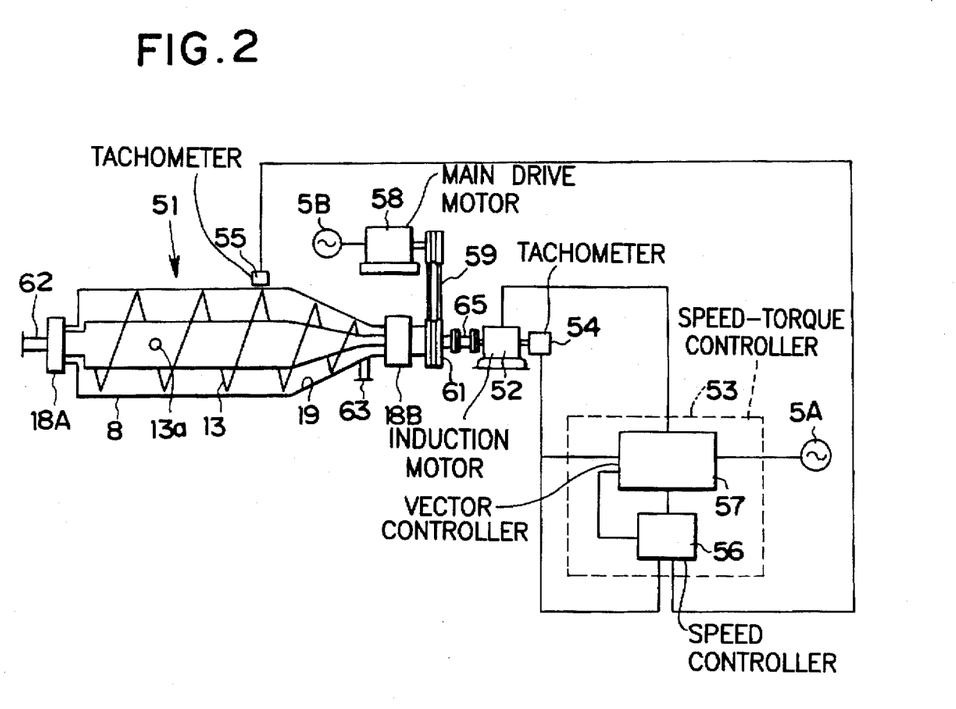
FIG. 2 is a schematic view of another embodiment or a screw decanter centrifuge of the present invention.

FIG. 2 is a schematic view of another embodiment of a screw decanter centrifuge of the present invention. In this figure, the same reference numerals are applied to the elements corresponding to those in the prior art screw decanter centrifuge shown in FIG. 3.

A screw decanter centrifuge 51 of the present embodiment uses an induction motor 52 as a motor for driving a screw conveyor 13. The induction motor 52 is connected to a shaft of the screw conveyor 13 through a coupling 65 (hereinafter referred to as "a flexural coupling"), and is connected to an AC power source 5A through a speed-torque controller 53. The speed-torque controller 53 is connected to an induction motor tachometer 54 for detecting the speed of the induction motor 52, and is also connected to a bowl tachometer 55 for detecting the speed of a bowl 8. A differential speed is calculated based on the detection results of the induction motor tachometer 54 and the bowl tachometer 55. The speed-torque controller 53 is constructed in combination with a speed controller 56 which determines the speed of the induction motor 52 and a vector controller 57. The vector controller 57 independently controls an exciting current and a torque current of the induction motor 52 based on a speed commend value outputted from the speed controller 56 and an actual speed of the induction motor 52 outputted from the induction motor tachometer 54, and always keeps a target differential speed even if the carrying torque of the screw conveyor 13 is changed. Thus, the screw decanter centrifuge 51 is constructed in combination with the mentioned devices.

On the other hand, a main drive motor 58 is connected directly to an AC power source 5B, and is adapted to drive the bowl 8 of the centrifuge 51 via a V belt 59 and a pulley 61. It is preferable that frequency conversion can be made by control of a variable voltage variable frequency inverter 75, as shown in FIG. 1A.

The bowl 8 is rotatably supported by bearings 18A, 18B at each end of the bowl 8, and a tapered part 19 is formed on one end side where the shaft of the bowl 8 is connected to the main drive motor 58. The bearing 18A at one side of the bowl 8 (on the left side of FIG. 2) is provided with an injection pipe 62 for injecting the stock solution, and the end of the injection pipe 62 is inserted into the inside hollow space of the shaft portion of the screw conveyor 13. The screw conveyor 13 is provided with a plurality of holes 13a for introducing the stock solution supplied through the injection pipe 62 into the bowl 8. The bearing 18 11 at the other side of the bowl 8 (on the left side of FIG. 2) is provided with a discharge port 63 for discharging the dehydrated cake separated from the stock solution. Configurations other than those mentioned above are similar to those of the prior art centrifuge of FIG. 3 described above.

In the screw decanter centrifuge of the present embodiment, the speed-torque controller 53 carries out differential speed control such that the number of revolutions of (N+ΔN) is given to the screw conveyor 13 so that the differential speed may be gained as ΔN in response to the number of revolutions N of the bowl 8. At the same time, the carrying load (torque) is controlled so as to be constant. Namely, if the carrying load (torque) of the screw conveyor 13 increases, the differential speed is increased, as a result of which the solid carrying speed is increased and the discharge amount of solids is increased. And inversely, if the carrying load (torque) of the screw conveyor 13 decreases, the differential speed is decreased, as a result of which the solid carrying speed is decreased and the discharge amount of solids is decreased. Thus, the solid residence time in the bowl 8 is prolonged so that the consolidation effect may be increased so as to control the carrying torque to be constant.

As described above, the screw decanter centrifuge of the present embodiment uses the induction motor 52 controlled by a vector control inverter as a motor for driving the screw conveyor 13, and the shaft of the induction motor 52 is connected through a flexural coupling to the shaft of the screw conveyor 13. Therefore, the speed and torque of the induction motor 52 can be controlled independently by the speed-torque controller 53 without using a torque detector or the like. As a result, a minute differential speed is provided in response to the number of revolutions of the bowl 8, and the differential speed is changeable in response to the carrying torque with high accuracy and good response.

As described above, according to the present invention, the screw conveyor 13 is not related dynamically to the bowl 8 at all and is driven independently of the bowl 8. Due to the non-dynamical relation between the screw conveyor 13 and the bowl 8, neither gear (differential gear) nor hydraulic motor is required. Thus, the shaft of the induction motor 52 controlled by the vector control inverter is connected through the flexural coupling to the shaft of the screw conveyor 13.

The induction motor 52 and the screw decanter centrifuge 51 are separated by the flexural coupling 65 and the induction motor 52 is separately supported. The radial load which the bearing 18B receives is limited only to that of the centrifuge 51 apart from the induction motor 52, which makes the radial load smaller in weight, allowing the life of the bearing 18B is made to be longer. Further, the total weight of the centrifuge 51 is reduced and the vibration arising from the centrifuge 51 is not transmitted to the induction motor 52. The vibration is confined exclusively to the centrifuge 51 with no resonance with any other related systems. Thus, the vibration is extremely small.

Therefore, a longer life of the supporter(bearing) is obtained, which causes an increase in the number of revolutions or the bowl 8 for obtaining a greater centrifugal effect, and an increase in the carrying torque of the screw conveyor 13 of obtaining greater consolidation effect. Thus, improvement is made in terms of the dehydrating performance (solid-liquid separation effect).

In the case of a comparatively small scale screw centrifuge, as a motor for driving the screw conveyor 13, a brushless motor equipped with a rotor position detector which is generally called AC servo-motor can be used in stead of the induction motor 52 controlled by the vector control inverter. The brushless motor creates a rotating magnetic field by using a permanent magnet as a rotor and by flowing an alternating current or pulsating current into a rotor winding, thereby a brush and a commutator conventionally necessary for a direct current motor being made useless As described above, according to the present invention, the induction motor which is controlled by the vector control inverter is used as a motor for driving the screw conveyor, and the shaft of the induction motor is connected through the flexural coupling to the shaft of the screw conveyor. Therefore, the system constitution of the screw decanter centrifuge can be simplified, which allows not only the manufacturing cost but also the running cost to be lowered, and also the differential speed control and the torque control to be carried out independently. In addition, the differential speed can be changed in response to the carrying torque with high accuracy and good response.

The screw conveyor is not connected dynamically with the bowl at all and is rotatably driven independently of the bowl. Therefore, a gear(differential gear) and a hydraulic motor are not required. Further, the shaft of the induction motor controlled by a vector controller and the shaft of the screw conveyor can be connected through the flexural coupling. Due to this connection, the radial load which bearings receive is reduced and the total rotation weight of the screw decanter centrifuge is also reduced. In addition, the vibration generated from the centrifuge is not transmitted to the induction motor which is controlled by the vector control inverter.

Thanks to these configurations described above, the centrifuge has a structure which does not easily generate vibrations so that the durability and life of the bearings is increased resulting in an increased number of revolutions of the bowl. Thus, greater centrifugal effect is obtained. In addition, the carrying torque of the screw conveyor is raised, and greater consolidation effect is obtained, which allows the solid-liquid separation to increase greatly.

Now the work of the configuration of the present invention will be described.

According to the present invention, the induction motor is used for driving the screw conveyor, the shaft of the induction motor is connected to the screw conveyor through the flexural coupling, and the induction motor is controlled by the vector control inverter (three-phase sine wave PWM control, digital vector control). The vector control means that the magnitude, frequency, and phase (that is, current vector) of primary current is controlled so that the primary current supplied to the induction motor is distributed to the exciting current (current for creating magnetic flux) and the torque current (current for creating torque) as values already set in the induction motor. For vector control, two systems are available, namely the magnetic field orientation system requiring the detection of magnetic flux of the induction motor and the slip-load frequency control system requiring the detection of number of revolutions of the induction motor. Either of the systems can be used. Since the vector control can control the exciting current and the torque current independently, it has the following features as compared with the conventional full variable frequency drive control which performs a constant control.

(1) Torque control can be carried out.
(2) Speed control can be implemented from zero speed with wide range speed control.
(3) The control response is high.
(4) The acceleration and deceleration characteristics are excellent.

In the case of an induction motor not subject to vector control, the slip is varied as the load changes, so that the number of revolutions is varied, while no additional instrument is required for the induction motor subject to vector control, and a constant number of revolutions can be controlled in a response time as short as 1/1000 second against the change in load. In addition, since the screw conveyor is driven directly, there is no transmission delay and loss due to the belt, and the load torque and the generated torque agree with each other. Specifically, the frequency can be taken as 0 to about 120 Hz, and the speed control range can be taken as 1:3000 to 1:50,000. The number of revolutions of the screw conveyor can be controlled to be 0 to 3600 rpm for a 4-pole electric motor, and the speed difference between the bowl and the screw conveyor can be controlled at a pitch of about 0.1 to 1 rpm. Further, generation of high output increases the consolidation sedimentation effect. Thus, the dehydration and solid-liquid separation performance is improved.

Making use of these advantages, the differential speed control which gives the number of revolutions of (N+ΔN) to the screw conveyor is carried out so that a differential speed ΔN is provided in response to the number of revolutions N of the bowl. A backdrive can also be performed so that the number of revolutions of the screw conveyor may be gained as (N−ΔN). However, this is not rational because the energy-saving operation requires an additional regeneration circuit.

Simultaneously with the above-described differential speed control, constant controlling is made for the carrying load (torque). Specifically, if the carrying load (torque) of the screw conveyor increases, the differential speed is increased, which also increases the solid carrying speed, causing the discharge amount of solids to increase. Inversely, if the carrying load (torque) of the screw conveyor decreases, the differential speed is decreased, which, moreover, decreases the solid carrying speed and the discharge amount of solids. Thus, the solid residence time in the bowl is prolonged for improving the consolidation effect.

Based on the present invention as described above, the screw conveyor can be independently rotated without any dynamical relation to the bowl. Therefore, neither gear (differential gear) nor hydraulic motor is required. This enables the induction motor controlled by the vector control inverter to be connected with the screw conveyor through flexural coupling.

What is claimed is:

1. A screw decanter centrifuge, comprising:

a cylindrical bowl rotatable in one direction;

a main drive motor coupled to said bowl for rotatably driving said bowl;

a screw conveyor disposed concentrically in said bowl and being rotatable in the same direction as said bowl at a differential rotation speed from said bowl, said differential rotation speed being changed in response to a carrying torque of said screw conveyor; and an induction type screw conveyor motor for driving said screw conveyor, said induction type screws conveyor motor having a shaft connected directly to a shaft of said screw conveyor, and said induction type screw conveyor motor being controlled by a spaced-torque controller;

wherein said speed-torque controller includes:

a speed controller for calculating said differential rotation speed based on rotations indicated by an induction motor tachometer for detecting a speed of said induction type screw conveyor motor, and on rotations indicated by a bowl tachometer for detecting a speed of said bowl; and a vector control inverter for independently controlling an exciting current and a torque current of said induction type screw conveyor motor based on a speed command value outputted from said speed controller and an actual speed of said induction type screw conveyor motor outputted from said induction motor tachometer.

2. The centrifuge of claim 1, wherein said speed controller of said speed-torque controller includes means for outputting a speed command value of (N+$\Delta$N) as a number of revolutions to said screw conveyor so that said differential rotation speed may be controlled to be $\Delta$N in response to N revolutions of said bowl.

3. A screw decanter centrifuge, comprising:

a cylindrical bowl rotatable in one direction;

a main drive motor coupled to said bowl for rotatably driving said bowl;

a screw conveyor disposed concentrically in said bowl and being rotatable in the same direction as said bowl at a differential rotation speed from said bowl, said differential rotation speed being changed in response to a carrying torque of said screw conveyor; and an induction type screw conveyor motor for driving said screw conveyor, said induction type screw conveyor motor having a shaft coupled to a shaft of said screw conveyor through a flexural coupling, and said induction type screw conveyor motor being controlled by a speed-torque controller;

wherein said speed-torque controller includes:

a speed controller for calculating said differential rotation speed based on rotations indicated by an induction motor tachometer for detecting a speed of said induction type screw conveyor motor, and on rotations indicated by a bowl tachometer for detecting a speed of said bowl; and a vector control inverter for independently controlling an exciting current and a torque current of said induction type screw conveyor motor based on a speed command value outputted from said speed controller and an actual speed of said induction type screw conveyor motor outputted from said induction motor tachometer.

4. The centrifuge of claim 3, wherein said speed controller of said speed-torque controller includes means for outputting a speed command value of (N+$\Delta$N) as a number of revolutions to said screw conveyor so that said differential rotation speed may be controlled to be $\Delta$N in response to N revolutions of said bowl.

* * * * *

UNITED STATES PATENT AND TRADEMARK OFFICE
CERTIFICATE OF CORRECTION

PATENT NO. : 5,681,256
DATED : October 28, 1997
INVENTOR(S) : NAGAFUJI, Masanori It is certified that error appears in the above-identified patent and that said Letters Patent is hereby corrected as shown below:

Column 1, line 13, "and more" should be --. More--.

Column 2, line 27, "gained to" should be --increased to thereby--.

Column 6, line 1, "or" should be --of--.

Column 7, line 34, "lowered; still" should be --lowered. Still--.

Column 8, line 23, "1811" should be --18B--.

Column 9, line 15, "or" should be --of--.

Column 11 (claim 1 line 15), "screws", should be "screw".

Column 11 (claim 1 line 18), "spaced", should be "speed".

Signed and Sealed this

Twenty-fifth Day of August, 1998

Attest:

BRUCE LEHMAN

*Attesting Officer*  *Commissioner of Patents and Trademarks*